(12) United States Patent
Moilanen et al.

(10) Patent No.: US 12,081,335 B2
(45) Date of Patent: Sep. 3, 2024

(54) OPTIMIZED MULTI CONNECTIVITY AND DATA DUPLICATION

(71) Applicant: NOKIA TECHNOLOGIES OY, Espoo (FI)

(72) Inventors: Jani Matti Johannes Moilanen, Helsinki (FI); Daniela Laselva, Klarup (DK); Kalle Petteri Kela, Kaarina (FI)

(73) Assignee: Nokia Technologies Oy, Espoo (FI)

( * ) Notice: Subject to any disclaimer, the term of this patent is extended or adjusted under 35 U.S.C. 154(b) by 287 days.

(21) Appl. No.: 17/310,629

(22) PCT Filed: Feb. 15, 2019

(86) PCT No.: PCT/EP2019/053806
§ 371 (c)(1),
(2) Date: Aug. 13, 2021

(87) PCT Pub. No.: WO2020/164733
PCT Pub. Date: Aug. 20, 2020

(65) Prior Publication Data
US 2022/0103293 A1    Mar. 31, 2022

(51) Int. Cl.
*H04W 56/00* (2009.01)
*H04L 1/08* (2006.01)
*H04W 72/12* (2023.01)

(52) U.S. Cl.
CPC .............. *H04L 1/08* (2013.01); *H04W 72/12* (2013.01)

(58) Field of Classification Search
CPC ................................ H04L 1/08; H04W 72/12
(Continued)

(56) References Cited

U.S. PATENT DOCUMENTS

2018/0110088 A1\* 4/2018 Zhu ..................... H04W 76/15
2018/0219662 A1\* 8/2018 Kim ...................... H04L 5/0051
(Continued)

FOREIGN PATENT DOCUMENTS

CN    104584671 A    4/2015
CN    108337171 A    7/2018
(Continued)

OTHER PUBLICATIONS

"JP 2005142692, Minagawa, Terminal Device, Network Monitoring Apparatus and Computer System, Nov. 5, 2023" (Year: 2003).\*
(Continued)

*Primary Examiner* — Sai Ming Chan
(74) *Attorney, Agent, or Firm* — Brake Hughes Bellermann LLP

(57) ABSTRACT

A method, apparatus, and a computer-readable storage medium are provided for providing optimized multi-connectivity and/or data duplication. In one example implementation, the method may include receiving, by a user equipment (UE), packet transmission pattern information from a first network node of one or more network nodes and transmitting, by the user equipment (UE), the consecutive packets using the different radio links indicated in the packet transmission pattern information. In an additional example implementation, the method may include determining, by a network node of a set of network nodes, packet transmission pattern information for a user equipment (UE). The example method may further include transmitting, by the network node, the packet transmission pattern information to the user equipment (UE). In a further additional example implementation, the method may include determining, by a network node of one or more network nodes, packet transmission pattern information of a user equipment (UE) and transmitting, by the network node, the packet transmission pattern information to another network entity. The example method
(Continued)

may further include transmitting, by the network node, one or more packets received from the another network entity.

21 Claims, 8 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2018/0310202 A1 | 10/2018 | Löhr et al. | |
| 2018/0367288 A1* | 12/2018 | Vrzic | H04W 36/22 |
| 2019/0207859 A1* | 7/2019 | Schmidtke | H04L 47/27 |

FOREIGN PATENT DOCUMENTS

| | | |
|---|---|---|
| CN | 108811175 A | 11/2018 |
| WO | 2018188717 A1 | 10/2018 |

OTHER PUBLICATIONS

International Search Report and Written Opinion for International Application No. PCT/EP2019/053806, mailed on Nov. 8, 2019, 13 pages.
3GPP TSG-SA WG2 Meeting #129, S2-1811216; "Evaluation of Solution #3, Supporting Redundant Data Transmission via Single UPF and Two RAN Nodes" Source: Ericsson, Qualcomm Inc.; Agenda Item: 6.20; Work Item/Release: FS_5G_URLLC/Rel-16; Dongguan, P.R. China; Oct. 15-19, 2018; 10 pages.
3GPP TSG-RAN WG2 Meeting #97bis, R2-1703731; "Packet Duplication Operations"; Agenda item: 10.2.3.1; Source: Samsung; Spokane, Washington, USA; Apr. 3-7, 2017; 3 pages.
Office Action for India Application No. 202147040868, mailed on Mar. 16, 2022, 5 pages.
Office Action and Search Report for Chinese Patent Application No. 201980092116.3, mailed on Jan. 11, 2024, 18 pages.
Second Office Action for Chinese Patent Application No. 201980092116.3, mailed on Jun. 5, 2024, 15 pages.

* cited by examiner

OPTIMIZED MULTI CONNECTIVITY AND DATA DUPLICATION

CROSS-REFERENCE TO RELATED APPLICATIONS

This application is a national stage entry of International Application No. PCT/EP2019/053806, filed Feb. 15, 2019, entitled "OPTIMIZED MULTI CONNECTIVITY AND DATA DUPLICATION" which is hereby incorporated by reference in its entirety.

TECHNICAL FIELD

This description relates to wireless communications, and in particular, to data transmissions between a user equipment (UE) and a network node, using data duplication and/or multiple-connectivity.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP or Evolved Node B (eNBs), provide wireless access within a coverage area or cell. In LTE, mobile devices, or mobile stations are referred to as user equipments (UE). LTE has included a number of improvements or developments.

5G New Radio (NR) development is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT), and may offer new types of mission-critical services. Ultra-reliable and low-latency communications (URLLC) devices may require high reliability and very low latency.

SUMMARY

A method, apparatus, and a computer-readable storage medium are provided for providing optimized multi-connectivity and/or data duplication.

In one example implementation, the method may include receiving, by a user equipment (UE), packet transmission pattern information from a first network node of one or more network nodes. The packet transmission pattern information indicates using different radio links by the user equipment (UE) for transmitting consecutive packets from the user equipment (UE) to the one or more network nodes and the radio links being associated with the one or more network nodes. The example method may further include transmitting, by the user equipment (UE), the consecutive packets using the different radio links indicated in the packet transmission pattern information.

In an additional example implementation, the method may include determining, by a network node of a set of network nodes, packet transmission pattern information for a user equipment (UE). The packet transmission pattern information indicates use of different radio links by the user equipment (UE) for transmitting consecutive packets from the user equipment (UE) and the set of network nodes configured for delivery of data to the user equipment (UE). The example method may further include transmitting, by the network node, the packet transmission pattern information to the user equipment (UE).

In a further additional example implementation, the method may include determining, by a network node of one or more network nodes, packet transmission pattern information of a user equipment (UE) and transmitting, by the network node, the packet transmission pattern information to another network entity. The example method may further include transmitting, by the network node, one or more packets received from the another network entity, the one or more packets determined by the another network entity based on the packet transmission pattern information.

DETAILED DESCRIPTION

Figure 1:
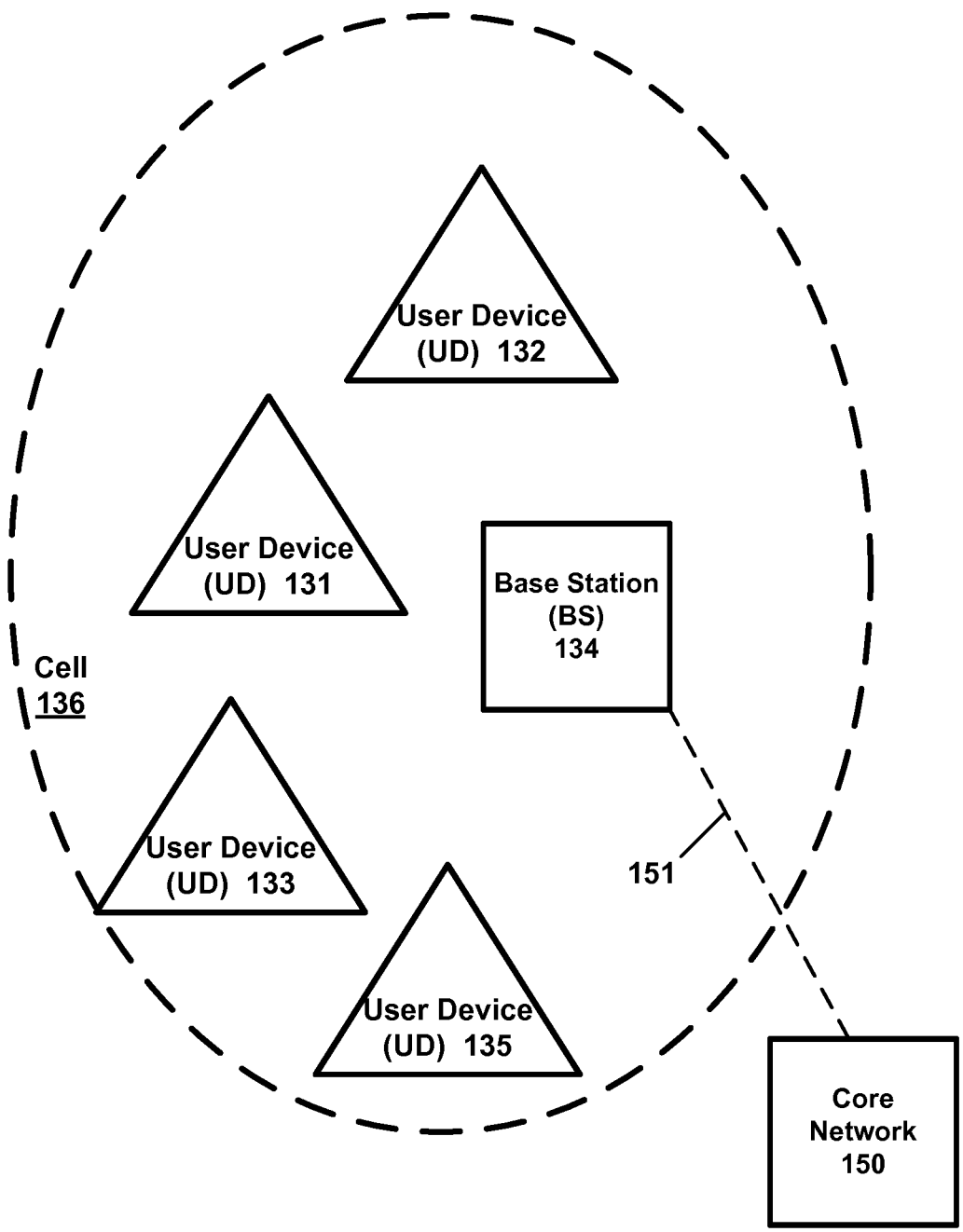
FIG. 1 is a block diagram of a wireless network according to an example implementation.

FIG. 1 is a block diagram of a wireless network 130 according to an example implementation. In the wireless network 130 of FIG. 1, user devices (UDs) 131, 132, 133 and 135, which may also be referred to as mobile stations (MSs) or user equipment (UEs), may be connected (and in communication) with a base station (BS) 134, which may also be referred to as an access point (AP), an enhanced Node B (eNB) or a network node. At least part of the functionalities of an access point (AP), base station (BS) or (e)Node B (eNB) may also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a 51 interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples, or any other wireless device. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example implementations or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC).

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC or machine to machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing up to e.g., 1 ms U-Plane (user/data plane) latency connectivity with 1-1e-5 reliability, by way of an illustrative example. Thus, for example, URLLC user devices/UEs may require a significantly lower block error rate than other types of user devices/UEs as well as low latency. Thus, for example, a URLLC UE (or URLLC application on a UE) may require much shorter latency, as compared to a eMBB UE (or an eMBB application running on a UE).

The various example implementations may be applied to a wide variety of wireless technologies or wireless networks, such as LTE, LTE-A, 5G, IoT, MTC, eMTC, eMBB, URLLC, etc., or any other wireless network or wireless technology. These example networks, technologies or data service types are provided only as illustrative examples.

Multiple Input, Multiple Output (MIMO) may refer to a technique for increasing the capacity of a radio link using multiple transmit and receive antennas to exploit multipath propagation. MIMO may include the use of multiple antennas at the transmitter and/or the receiver. MIMO may include a multi-dimensional approach that transmits and receives two or more unique data streams through one radio channel. For example, MIMO may refer to a technique for sending and receiving more than one data signal simultaneously over the same radio channel by exploiting multipath propagation. According to an illustrative example, multi-user multiple input, multiple output (multi-user MIMIO, or MU-MIMO) enhances MIMO technology by allowing a base station (BS) or other wireless node to simultaneously transmit or receive multiple streams to different user devices or UEs, which may include simultaneously transmitting a first stream to a first UE, and a second stream to a second UE, via a same (or common or shared) set of physical resource blocks (PRBs) (e.g., where each PRB may include a set of time-frequency resources).

Also, a BS may use precoding to transmit data to a UE (based on a precoder matrix or precoder vector for the UE). For example, a UE may receive reference signals or pilot signals, and may determine a quantized version of a DL channel estimate, and then provide the BS with an indication of the quantized DL channel estimate. The BS may determine a precoder matrix based on the quantized channel estimate, where the precoder matrix may be used to focus or direct transmitted signal energy in the best channel direction for the UE. Also, each UE may use a decoder matrix may be determined, e.g., where the UE may receive reference signals from the BS, determine a channel estimate of the DL channel, and then determine a decoder matrix for the DL channel based on the DL channel estimate. For example, a precoder matrix may indicate antenna weights (e.g., an amplitude/gain and phase for each weight) to be applied to an antenna array of a transmitting wireless device. Likewise, a decoder matrix may indicate antenna weights (e.g., an amplitude/gain and phase for each weight) to be applied to an antenna array of a receiving wireless device. This applies to UL as well when a UE is transmitting data to a BS.

For example, according to an example aspect, a receiving wireless user device may determine a precoder matrix using Interference Rejection Combining (IRC) in which the user device may receive reference signals (or other signals) from a number of BSs (e.g., and may measure a signal strength, signal power, or other signal parameter for a signal received from each BS), and may generate a decoder matrix that may suppress or reduce signals from one or more interferers (or interfering cells or BSs), e.g., by providing a null (or very low antenna gain) in the direction of the interfering signal, in order to increase a signal-to interference plus noise ratio (SINR) of a desired signal. In order to reduce the overall interference from a number of different interferers, a receiver may use, for example, a Linear Minimum Mean Square Error Interference Rejection Combining (LMMSE-IRC) receiver to determine a decoding matrix. The IRC receiver and LMMSE-IRC receiver are merely examples, and other types of receivers or techniques may be used to determine a decoder matrix. After the decoder matrix has been determined, the receiving UE/user device may apply antenna weights (e.g., each antenna weight including amplitude and phase) to a plurality of antennas at the receiving UE or device based on the decoder matrix. Similarly, a precoder matrix may include antenna weights that may be applied to antennas of a transmitting wireless device or node. This applies to a receiving BS as well.

In 3GPP Rel-15 NR, packet data convergence protocol (PDCP) Duplication via New Radio (NR) Dual Connectivity (DC) is supported. However, there are limitations. For instance, a PDCP entity that duplicates PDCP protocol data units (PDUs) may support only two associated radio link control (RLC) protocol entities (also referred to as RLC entity, or RLC leg, or simply leg) which are associated at a physical layer with a component carrier, or a radio link/radio frequency (RF) link (which may be referred to as a radio leg or simply leg). One of the two RLC entities may be located in the same node, e.g., master node (MgNB), and the other RLC entity may be located in a secondary node (SgNB). The two nodes, e.g., MgNB and SgNB may be connected via an Xn interface. The Xn interface may include a user plane interface, e.g., Xn-U, for user data, and a control plane interface, e.g., Xn-C, for control data. In 3GPP Rel-16, PDCP duplication for more than two legs may be supported by combining dual connectivity (DC) and carrier aggregation (CA). In addition, multiple legs may be introduced via higher layer multi-connectivity.

Applications (some applications, e.g., industrial applications) may be able to tolerate individual packet errors, but, may not be able to tolerate consecutive (e.g., subsequent, adjacent, sequential, etc.) packet errors due to the inherent limitations of the application. For instance, a communication system used in an industrial setting should not have packet errors resulting in exceeding survival time of the system which may also affect the reliability of the industrial application. Survival time, for example, may be defined as time (e.g., duration) an application may survive without receiving the expected packet(s) or the time that an application consuming a communication service may continue without an anticipated message. Additional details may be found in 3GPP TR 22.804.

However, when using mechanisms/procedures that use multiple legs (e.g., links), it is desirable to minimize unnecessary data duplication (e.g., packet duplication) to reduce, for example, resource waste and interference in the network, which is also desirable from a reliability perspective. For instance, "blind" usage of the available legs for packet duplication (e.g., without considering the consequences) for transmitting multiple copies of packet(s) at a time may even reduce the achieved reliability in a loaded network. Therefore, mechanisms/procedures that can manage/provide/allow/control the usage of the multi connectivity legs, with or without duplication, in a smart and efficient way are desired/needed.

In addition, such a mechanism should minimize the probability of having multiple consecutive packet errors, for example, at an application level, which would cause result in exceeding of survival time. If the survival time is exceeded, this may trigger an emergency (e.g., recovery) procedure which may have negative consequences, e.g., in terms of increased cost, lost production, etc. (e.g., the factory may have to temporarily suspend production and/or automation). Therefore, such occurrences should be rare. In addition, for URLLC applications with very strict latency requirement (e.g., motion control in factory automation), reactive methods which rely on feedback (over the air, or via non-ideal network interfaces, such as Xn), may not be useful or they can be applied only occasionally and/or for only some of the packets, to avoid the severe consequences described above.

The proposed mechanism includes a method to maximize transmit diversity for consecutive packets (e.g., transmitting consecutive packets across different legs/RF links) to minimize the likelihood of exceeding the survival time. In some implementations, this may be achieved by transmitting consecutive packets using different legs and/or with packet duplication.

For instance, for URLLC applications with very short periodicity (e.g., industrial applications with ~0.5-1 ms periodicity), there may not be enough time for the radio channel to improve or react to packet errors with corrective actions before next packet arrives. Therefore, packet errors within each leg may have high correlation leading to exceeding of application survival time if packets are transmitted only via a single leg. The errors across different legs, however, may have lower correlation (e.g., compared to the errors within a single leg), and therefore, in some implementations, usage of multiple legs within survival time can offer reliability benefits. Furthermore, in some implementations, if errors within individual legs are highly correlated, transmitting subsequent packets over different subsets of legs (i.e., applying leg switching) may achieve similar reliability than transmitting over all legs, but with less overhead. The lower overhead reduces scheduling delays and interference, and therefore can offer further reliability improvements especially when the network load is high.

In one example implementation, the method may include receiving, by a user equipment (UE), packet transmission pattern information from a first network node of one or more network nodes. The packet transmission pattern information indicates using different radio links by the user equipment (UE) for transmitting consecutive packets from the user equipment (UE) to the one or more network nodes and the radio links being associated with the one or more network nodes. The example method may further include transmitting, by the user equipment (UE), the consecutive packets using the different radio links indicated in the packet transmission pattern information.

In an additional example implementation, the method may include determining, by a network node of a set of network nodes, packet transmission pattern information for a user equipment (UE). The packet transmission pattern information indicates use of different radio links by the user equipment (UE) for transmitting consecutive packets from the user equipment (UE) and the set of network nodes configured for delivery of data to the user equipment (UE). The example method may further include transmitting, by the network node, the packet transmission pattern information to the user equipment (UE).

In a further additional example implementation, the method may include determining, by a network node of one or more network nodes, packet transmission pattern information of a user equipment (UE) and transmitting, by the network node, the packet transmission pattern information to another network entity. The example method may further include transmitting, by the network node, one or more packets received from the another network entity, the one or more packets determined by the another network entity based on the packet transmission pattern information.

Figure 2:
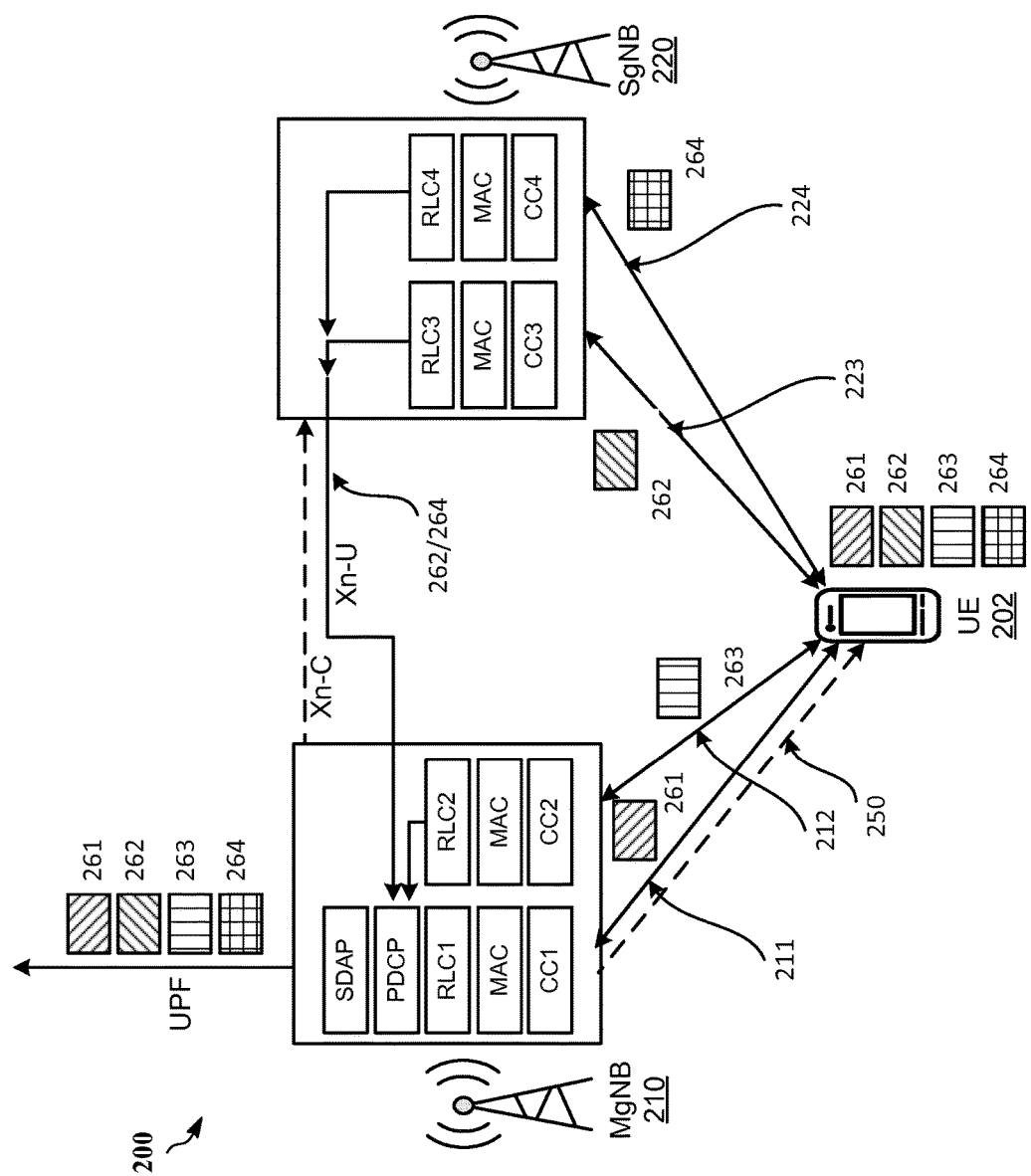
FIG. 2 is a block diagram illustrating transmission of data from a user equipment, according to an example implementation.

FIG. 2 is a block flow diagram 200 illustrating transmission of data from a user equipment (UE), for example, UE 202, according to one example implementation.

For example, FIG. 2 illustrates a multi-connectivity (MC) configuration with a master gNB (e.g., MgNB 210) and a secondary gNB (e.g., SgNB 220) in communication with UE

202. In some implementations, MgNB 210 may be configured with two component carriers (CCs), e.g., CC1 and CC2 associated with links 211 and 212, respectively, and/or SgNB 220 may be configured with two CCs, e.g., CC3 and CC4 associated with links 223 and 224. In some example implementations, CC1 and CC2 may be on the same or different frequencies as CC3 and CC4. The links 211, 212, 223, and 224 may be used for uplink and/or downlink communications between UE 202 and MgNB 210/SgNB 220.

For example, in one implementation, a network node (e.g., MgNB 210) may determine packet transmission pattern information, e.g., packet transmission pattern information 250 (e.g., P) for a user equipment (UE), e.g., UE 202, and send packet transmission pattern information 250 to the UE. The packet transmission pattern information 250 may indicate to UE 202 the links (e.g., RF links, links, etc.) the UE should use, for example, for transmitting consecutive packets on the uplink to one or more network nodes, e.g., MgNB 210 and/or SgNB 220. In an example implementation, a network node, e.g., MgNB 210 may determine the packet transmission pattern information 250 based on, for example, one or more of reliability target metrics, survival time, knowledge and quality of the radio links, location of the user equipment (UE), mobility of the user equipment (UE), trajectory of the user equipment (UE), etc., or a combination thereof. In some implementations, a gNB-Centralized Unit (gNB-CU) may determine the packet transmission pattern information 250.

In some implementations, packet transmission pattern information 250 may be signaled to UE 202 as part of dual connectivity (DC)/multi-connectivity (MC) configuration via RRC and/or using a MAC CE indication, or a downlink control information (DCI) indication.

In one example implementation, packet transmission pattern information 250 may be a cyclic pattern and/or the RAN, e.g., MgNB 210, may send the cyclic pattern, e.g., P, to UE 202 using a vector of link/leg identifiers. For example, P=[1, 3, 2, 4], which may indicate to UE 202 to transmit consecutive packets (e.g., packet IDs p1, p2, p3, p4, p5, p6, p7, p8, . . . ) over the following leg indices: [1, 3, 2, 4, 1, 3, 2, 4, . . . ]. For instance, the indices may be associated with the links/legs as shown below:

index 1=CC1 at gNB1/MgNB 210 (CC1/211)
   index 2=CC2 at gNB1/MgNB 210 (CC2/212)
   index 3=CC1 at gNB2/SgNB 220 (CC3/223)
   index 4=CC2 at gNB2/SgNB 220 (CC4/224)

In some implementations, UE 202 may transmit consecutive packets to the network nodes, e.g., MgNB 210/SgNB 220 based on the packet transmission pattern information 250. For example, packets p1 (261), p2 (262), p3 (263), and p4 (264) may be respectively transmitted over links/legs 1 (CC1/211), 3 (CC3/223), 2 (CC2/212), 4 (CC4/224), and so on.

In another example implementation, the packet transmission pattern information 250 may be a bitmap, e.g., P=[1, 0, 1, 1], which may indicate transmission of consecutive packets over following link/leg indices [1, 3, 4, 1, 3, 4, . . . ]. In other words, for example, packets p1 (261), p2 (262), p3 (263), and p4 (264) may be respectively transmitted over legs 1 (CC1/211), 3 (CC3/223), 4 (CC4/224), 1 (CC1/211), respectively, and so on.

In some implementations, UE 202 may determine whether packet transmission pattern information 250 indicates duplication of packets. It should be noted that packet duplication may be configured (allowed), for example, in combination with transmission of consecutive packets over different links (as described above) or by itself. If UE 202 determines that packet transmission pattern information 250 does not indicate packet duplication, UE 202 may not use duplicate packet transmissions.

In some implementations, packet transmission pattern information 250 may include a validity timer. For example, the validity timer may indicate the duration (e.g., X ms) for which UE 202 should use the packet transmission pattern information P 250 for transmitting packets. In an example implementation, upon expiration of the validity timer, UE 202 may use a default packet transmission pattern which may have been configured at UE 202 prior to the receiving of the packet transmission pattern information 250. In some implementations, packet transmission pattern information 250 may indicate the number of packets (e.g., Y number of packets) to be transmitted by UE 202 using packet transmission pattern information 250.

A network node, e.g., MgNB 210, in some implementations, may send updated packet transmission pattern information 252 (e.g., second packet transmission pattern information) to UE 202. UE 202 may transmit packets based on updated packet transmission pattern information 252 upon expiration of the validity timer associated with packet transmission pattern information 250. In an example implementation, UE 202 may transmit packets based on updated packet transmission pattern information 252 upon receiving the updated packet transmission pattern information 252 (e.g., without waiting for expiration of the validity timer associated with packet transmission pattern information 250). In an additional example implementation, the network node, e.g., MgNB 210, may indicate to UE 202 whether the UE should wait for the expiration of the validity timer of the previous packet transmission pattern information, e.g., X ms associated with packet transmission pattern information 250. In one more additional example implementation, the network node, e.g., MgNB 210, may indicate to UE 202 whether the UE should wait until the UE has transmitted the number of packets indicated in the previous packet transmission pattern information, e.g., Y packets indicated in packet transmission pattern information 250. This provides flexibility (e.g., capabilities) to update packet transmission patterns to quickly/efficiently respond to changing conditions (e.g., link conditions, traffic considerations, other triggers, etc.) for example, in a factory environment.

In some implementations, a network node, e.g., MgNB 210 may send an indication terminating the use of a packet transmission pattern by a UE. Upon receiving of the termination message, UE 202 may revert back to the previously configured packet transmission pattern (in one example, may be a default packet transmission pattern). In one example implementation, the network node may indicate whether the termination is effective immediately, or upon expiration of a validity timer, or after transmission of a certain number of packets.

In some implementations, a network node, e.g., MgNB 210, may send relevant portions of packet transmission pattern information to SgNB 220 as well. A relevant portion of packet transmission pattern information 250 may be defined as the portions of packet transmission pattern information 250 that applies to transmissions between UE 202 and SgNB 220. This provides an opportunity to SgNB 220 for providing a scheduling grant (e.g., one more grant(s)) to UE 202 for transmissions to SgNB 220. MgNB 210, as described above, may determine packet transmission pattern information 250. In one example implementation, therefore, MgNB 210 has the information to provide a scheduling grant (e.g., one more grant(s)) to UE 202 for transmissions to MgNB 210. In some implementations, the scheduling grants (e.g., one or more scheduling grant(s)) may include pre-allocated grant(s), for example, configured grants (CGs). In some other implementations, the CGs may be periodic and may not be tailored to the packet transmission pattern (based on the packet transmission pattern information 250). In such a scenario, the UE may skip using some of the CGs to follow the packet transmission pattern indicated by packet transmission pattern information 250/252. In some implementations, UE 202 can receive semi-persistent scheduling (SPS) grant(s) (for example, from a gNB) according a transmission pattern and the UE would monitor the indicated allocations.

Thus, a network node can determine a packet transmission pattern for a UE and send the determined packet transmission pattern to the UE so that the UE can use it for transmitting consecutive packets in the uplink to one or more network nodes to improve, for example, resource efficiency and/or network reliability.

Figure 3:
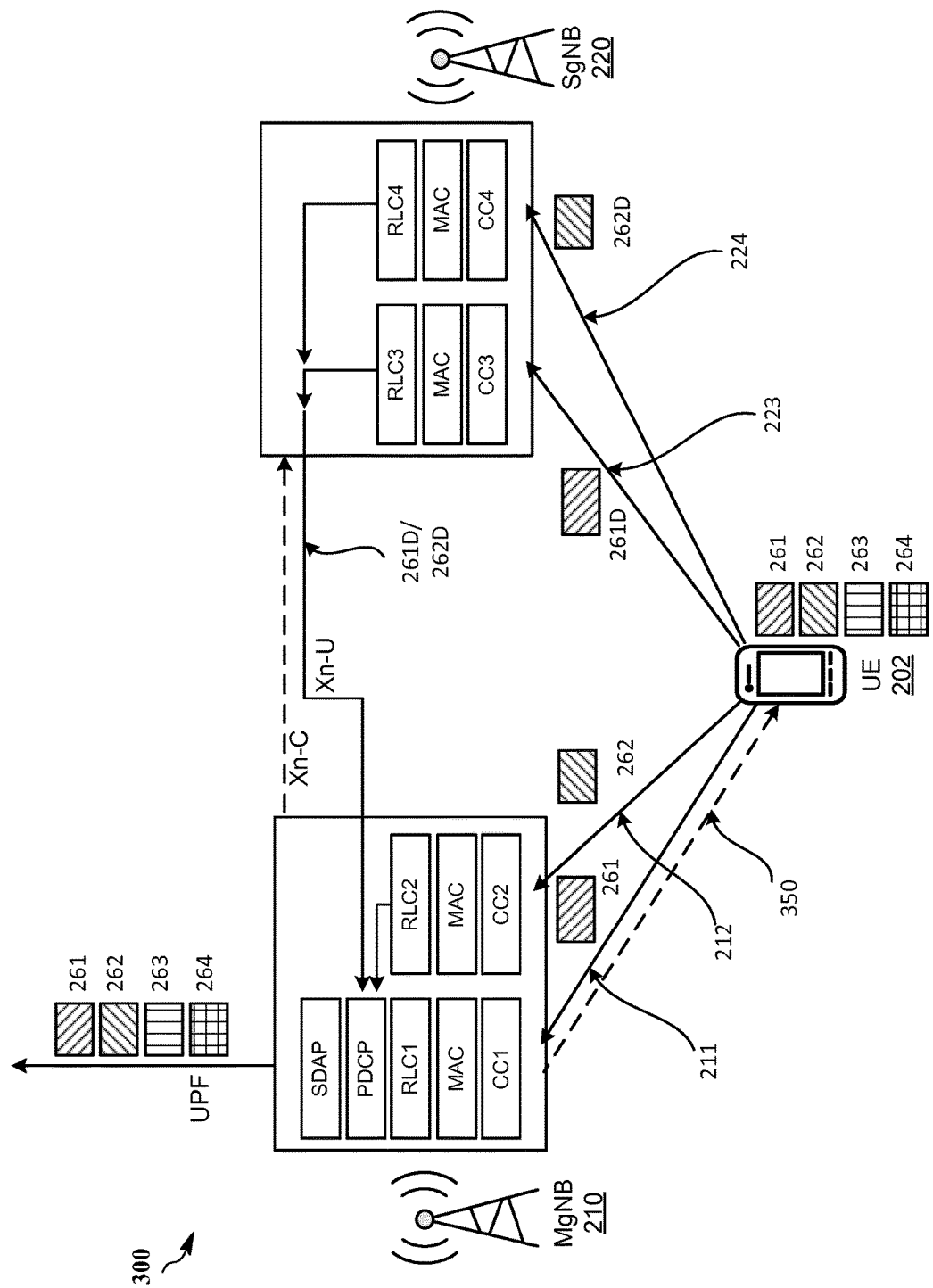
FIG. 3 is a block diagram illustrating transmission of data from a user equipment to a network node, according to an additional example implementation.

FIG. 3 is a block diagram 300 illustrating transmitting of data from a UE to a network node, according to an additional example implementation.

In some implementations, UE 202 may determine whether packet transmission pattern information, e.g., packet transmission pattern information 350, received from a network node, e.g., MgNB 210 indicates duplication of packets. It should be noted that packet duplication may be provided (e.g., allowed, supported, configured, etc.) in combination with transmission of consecutive packets over different links, for example, as described in any of the implementation(s) above, or by itself. In an example implementation, if UE 202 determines that packet transmission pattern information 350 indicates packet duplication, UE 202 may duplicate packet transmissions based on the packet transmission pattern information 350.

For example, in some implementations, the RAN, e.g., MgNB 210, may send a cyclic pattern to UE 202 as multitude of bitmaps, indicating a repeating usage of one or more legs simultaneously using packet duplication. For instance, P=[v1, v2], where v1=[1, 0, 1, 0] to be used for a packet, and v2=[0, 1, 0, 1] to be used for the corresponding copy of the packet. In an example implementation, this may result in uplink transmissions to happen over the following legs:

packet p1 (261) and its copy (261D) over links [1 AND 3]
packet p2 (262) and its copy (262D) over links [2 AND 4]

In addition, packets p3 (263) and p4 (264) (of FIG. 2, not shown in FIG. 3) may be transmitted similarly as described above. For example, in one implementation, packet p3 may be transmitted over link CC3, packet p4 may be transmitted over link CC4, packet p3D may be transmitted over link CC2, and packet p4D may be transmitted over link CC1. In another example implementation, packet p3 may be transmitted over link CC1, packet p4 may be transmitted over link CC2, packet p3D may be transmitted over link CC4, and packet p4D may be transmitted over link CC3. In some implementations, the network node, e.g., MgNB 210, may send an updated packet transmission pattern information 352 to UE 202, which the UE may use based on the indication associated with, e.g., validity timer, number of packets, etc., as described above.

For example, in one implementation, the duplicated packets may be transmitted by UE 202 using a primary radio link and a secondary radio link. The primary link, for example, may be defined as a link to use if there is no duplication and the secondary link is the additional link to use to transmit the duplicates if duplication is activated. In some implementations, even without duplication, the primary and secondary links may be used by interleaving them for sending subsequent packets. For example, UE 202 may transmit packet p1 (261) using link 211 and its duplicate, packet 261D using link 223. In an additional example implementation, UE 202 may dynamically change the primary and second radio links based on various factors, e.g., link conditions, link utilization, etc. For example, the UE changes the primary link with the secondary link according to the transmission pattern. In another example, the UE may be instructed (for example, by the gNB) to autonomously decided on how to interleave the transmissions among the configured legs. The primary and secondary radio links may be defined by the network node (e.g., MgNB/SgNB), the UE (e.g., UE 202), or may be indicated in the packet transmission pattern information 350.

In some implementations, the validity timers may indicate validity timers (e.g., indicates different duration information) for transmitting consecutive packets using different radio links (e.g., as described in reference to FIG. 2) and for packet duplication. For instance, the packet transmission pattern information 350 may include a validity timer, $T_1$, for transmitting consecutive packets, and $T_2$, for packet duplication. For example, UE 202 may stop packet duplication upon expiration of $T_2$ but continue transmitting packets based on the packet transmission pattern information P 350 until the expiration of $T_1$. In some implementations, packet transmission pattern information 350 may indicate different number of packets for transmitting consecutive packets using different radio links (e.g., as describe in reference to FIG. 2) and for packet duplication.

In some implementations, packet transmission pattern information 350 may indicate using different patterns based on the priority levels of the packets. For example, if a packet is considered a higher priority (e.g., critical heartbeat/keep-alive packet), the packet transmission pattern information 350 may indicate duplication in addition to transmitting consecutive packets over different legs.

In some implementations, the best link of the links (e.g., RF link quality, etc.) may be configured as a primary link and the other links as secondary links (e.g., set of secondary links). The primary link and secondary links (e.g., set of secondary links) may be changed, as needed, to reduce the occurrence of error bursts.

Thus, a network node can determine a packet transmission pattern for a UE and send the determined packet transmission pattern to the UE so that the UE can use it for transmitting consecutive packets, including packet duplication, in the uplink to one or more network nodes to improve, for example, resource efficiency and/or network reliability.

Figure 4:
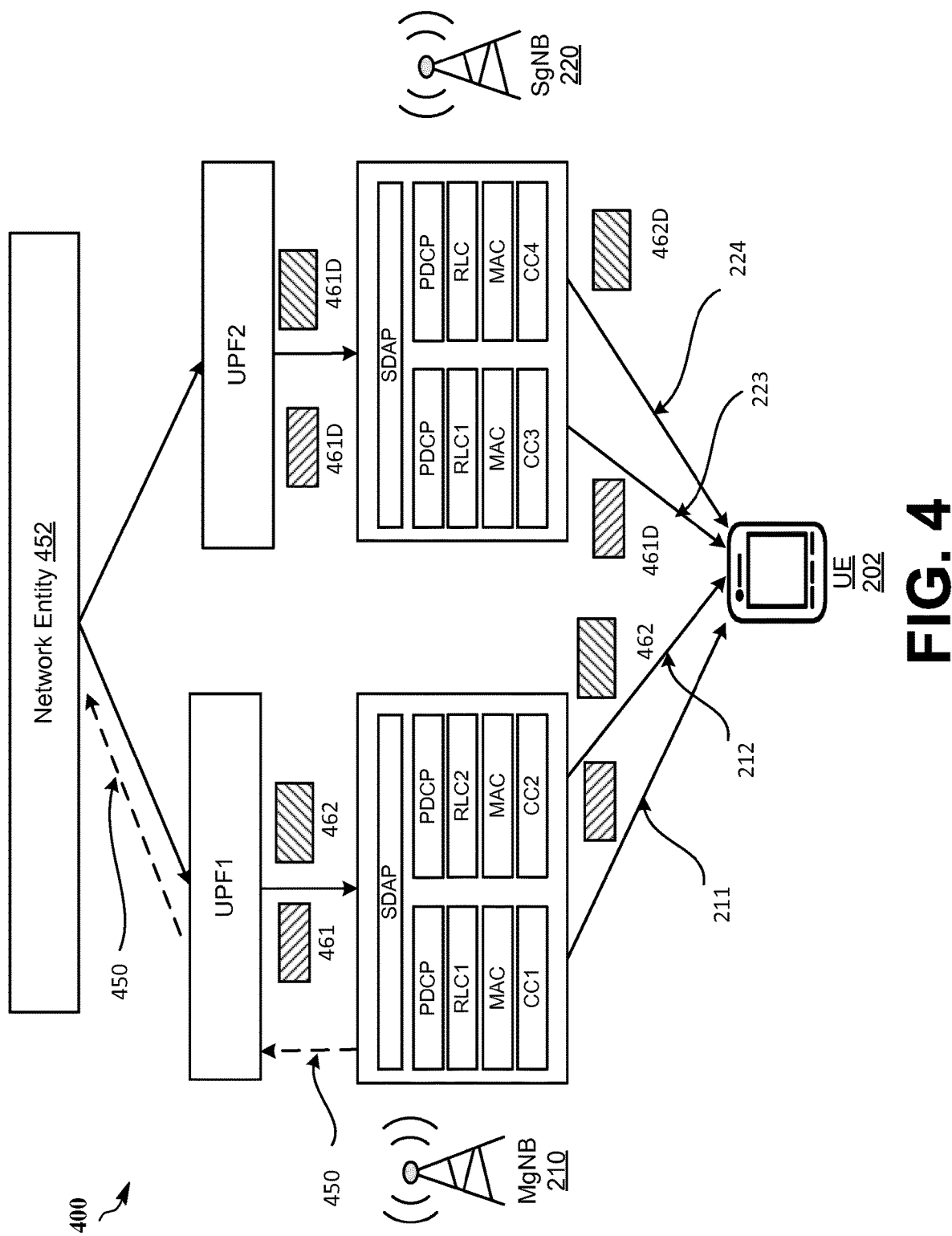
FIG. 4 is a block diagram illustrating transmission of data from a network node, according to an example implementation.

FIG. 4 is a block diagram 400 illustrating transmitting of data from network node, e.g., MgNB 210/SgNB 220, according to an example implementation.

A network node, e.g., MgNB 210, in an example implementation, may determine packet transmission pattern information, e.g., packet transmission pattern information 450 (e.g., P) for a user equipment (UE), e.g., UE 202, and send the packet transmission pattern information 450 to the UE. The packet transmission pattern information 450 may be determined based on, for example, one or more of reliability target metrics, survival time, knowledge and quality of the radio links, location of the user equipment (UE), mobility of the user equipment (UE), trajectory of the user equipment (UE), etc., or a combination thereof.

In some implementations, for example, the network node (e.g., MgNB 210) may transmit (e.g., via user plane function 1 (UPF1)) the determined packet transmission pattern information 450 to another network entity, network entity 452. In one example implementation, the network entity 452 may be a core network entity. In an example implementation, network entity 452 may perform packet duplication and transmit the packets to the network nodes, e.g., packets 461 and 462 to MgNB 210; packets 461D and 462D to SgNB 220 (via corresponding UPF, e.g., UPF1 and UPF2) so that the packets may be transmitted to the UE.

The example implementations described above in reference to FIGS. 2 and 3 in the context of the uplink/downlink and/or data duplication may apply for downlink communications between MgNB 201/SgNB 220 and UE 202 as illustrated in FIG. 4.

Thus, a network node can determine a packet transmission pattern for a UE and send the determined packet transmission pattern to another higher layer network entity which may transmit consecutive packets, which are duplicated, over different links, to improve, for example, resource efficiency and/or network reliability.

Additional example implementations are described herein.

In some implementations, a network node (e.g., MgNB 210 may send the packet transmission pattern information, which may include a cyclic pattern, to a UE as a vector of ratios, and the UE may be allowed to decide which leg/link is used to transmit first. For example, P=[75%, 0%, 0%, 25%], which would result to a repeating uplink transmission with one of the following patterns [4, 1, 1, 1], [1, 4, 1, 1], [1, 1, 4, 1], or [1, 1, 1, 4]. It should be noted that these example patterns result to similar behavior when repeated. Alternatively, the packet transmission pattern information may specify that the UE needs to start its pattern with a certain leg (e.g., via additional information provided by network, or UE is specified to follow certain rule).

In some implementations, in a link adaptation process, the RAN may estimate for each configured leg which modulation coding scheme (MCS) to use to satisfy a target block error rate (BLER). In one example implementation, the most robust MCSs (e.g., low signal-to-interference-plus-noise-ratio (SINR)), transmission of uplink packet may be spread over multiple TTIs (e.g., depending on availability of uplink resources). In another example implementation, a simple scenario, the RAN may include in the packet transmission pattern information only those legs which are able to transmit uplink data packets with smallest number of TTIs (e.g., one TTI). In another example implementation, the RAN may provide more packets (e.g., higher ratio within the pattern) to those legs which have lowest estimated BLER (e.g., if two legs have equal MCS, RAN would use higher ratio for the leg with higher estimated SINR).

In some implementations, for example, if a service (e.g., an application) can tolerate a maximum of two consecutive packet errors, and there are two configured legs, the RAN could schedule two out of three packets on the first leg, if the first leg has significantly higher SINR compared to the second leg. Since transmission errors over the same leg may have much higher correlation (e.g., channel correlation time is longer than transmission interval for the target URLLC use cases) compared to transmission errors over different legs, this may provide the smallest probability of having three consecutive errors (e.g., however, with equal ratios, every second three packet sequence would have two out of three packets transmitted over the weaker leg, and all packets transmitted over the first leg would be also worse due to high correlation). Similarly, for DL, a UE may indicate the quality of the legs (e.g., using existing channel measurement reports, and/or with some further signalling, like suggesting pattern for leg usage). Since there may be high correlation between errors occurring in a short time frame when transmitting over any single leg, including the strongest/best leg, in some implementations, legs that are not the best legs, e.g., second, thirds, legs, etc. may be used (if the legs meet certain threshold requirements) periodically to avoid consecutive errors and meet the survival time requirements.

In some implementations, if the RAN learns that the optimal pattern changes infrequently, for example, on average once every 100 TTIs, it could indicate that pattern is valid for 100 TTIs and reduce frequency of pattern signaling to every 100 TTIs. However, in case the RAN sees a need to change the pattern earlier, it sends a new pattern which overrides the previous pattern. This would reduce the signaling overhead caused by the patterns by, e.g., 100-fold, with minimal impact on the pattern dynamicity. In the case that RAN decides to terminate the usage of pattern completely (e.g., only primary leg has sufficient quality), it could send a one-bit indication that causes UE to return to a pre-defined default mode (e.g., use only primary leg). The aforementioned pattern change may be also UE assisted. For example, the UE may trigger measurement reporting or any leg quality related report if certain leg (e.g., used for duplicate packet transmissions) becomes significantly better or worse than other legs. Then a network node can react by changing the pattern accordingly, e.g., may favor only legs with satisfactory quality, before the pattern validity period expires to ensure high reliability of utilized transmission legs.

Figure 5:
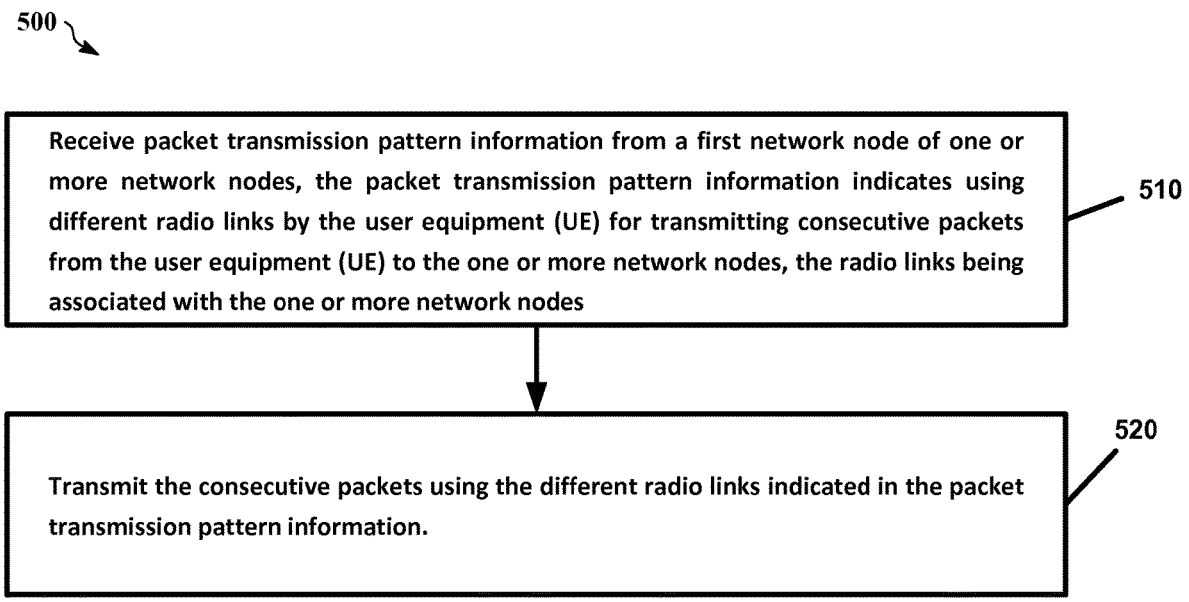
FIG. 5 is a flow chart illustrating transmission of data from a user equipment, according to an example implementation.

FIG. 5 is a flow chart 500 illustrating transmitting of data from a user equipment (UE), for example, from UE 202, according to at least one example implementation.

At block 510, a UE (e.g., UE 202) may receive packet transmission pattern information (e.g., packet transmission pattern information 250) from a first network node (e.g., MgNB 210) of one or more network nodes (e.g., MgNB 201, SgNB 220, etc.). In an example implementation, the packet transmission pattern information 250 may indicate radio link usage by the UE for transmitting consecutive packets (e.g., packets 261, 262, 263, 264, etc.) from the UE to the network nodes.

At block 520, the UE (e.g., UE 202) may transmit the consecutive packets using the different radio links indicated in the packet transmission pattern information. For example, UE 202 may transmit the consecutive packets as described above in reference to FIG. 2. In an additional implementation, the UE may transmit packets as described above in reference to FIG. 3 when the UE determines that packet duplication is indicated in the packet transmission pattern information 250.

Figure 6:
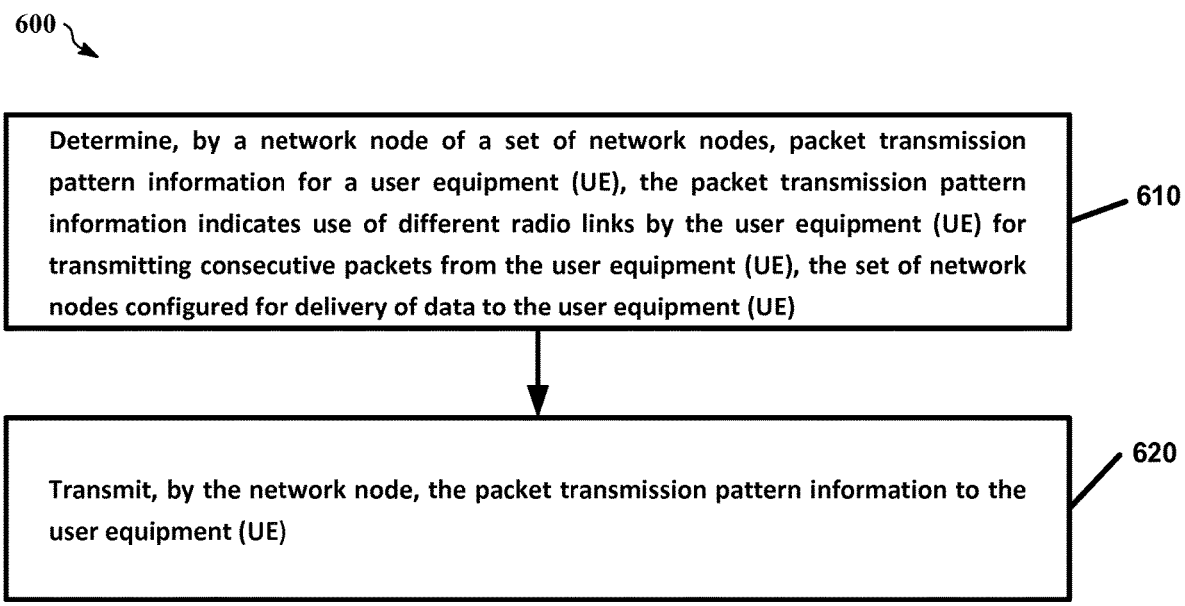
FIG. 6 is a flow chart illustrating transmission of data from a network node, according to an example implementation.

FIG. 6 is a flow chart 600 illustrating transmission of data from a network node, according to an example implementation.

At block 610, a network node (e.g., MgNB 210) may determine packet transmission pattern information (e.g., packet transmission pattern information 250) for a UE (e.g., UE 202). In an example implementation, the packet transmission pattern information 250 may indicate (to the UE) the different radio links the UE should use for transmitting consecutive packets (e.g., packets 261, 262, 263, 264, etc.).

At block 620, the network node (e.g., MgNB 210) may transmit the packet transmission pattern information (e.g., packet transmission pattern information 250) to the UE (e.g., UE 202).

Figure 7:
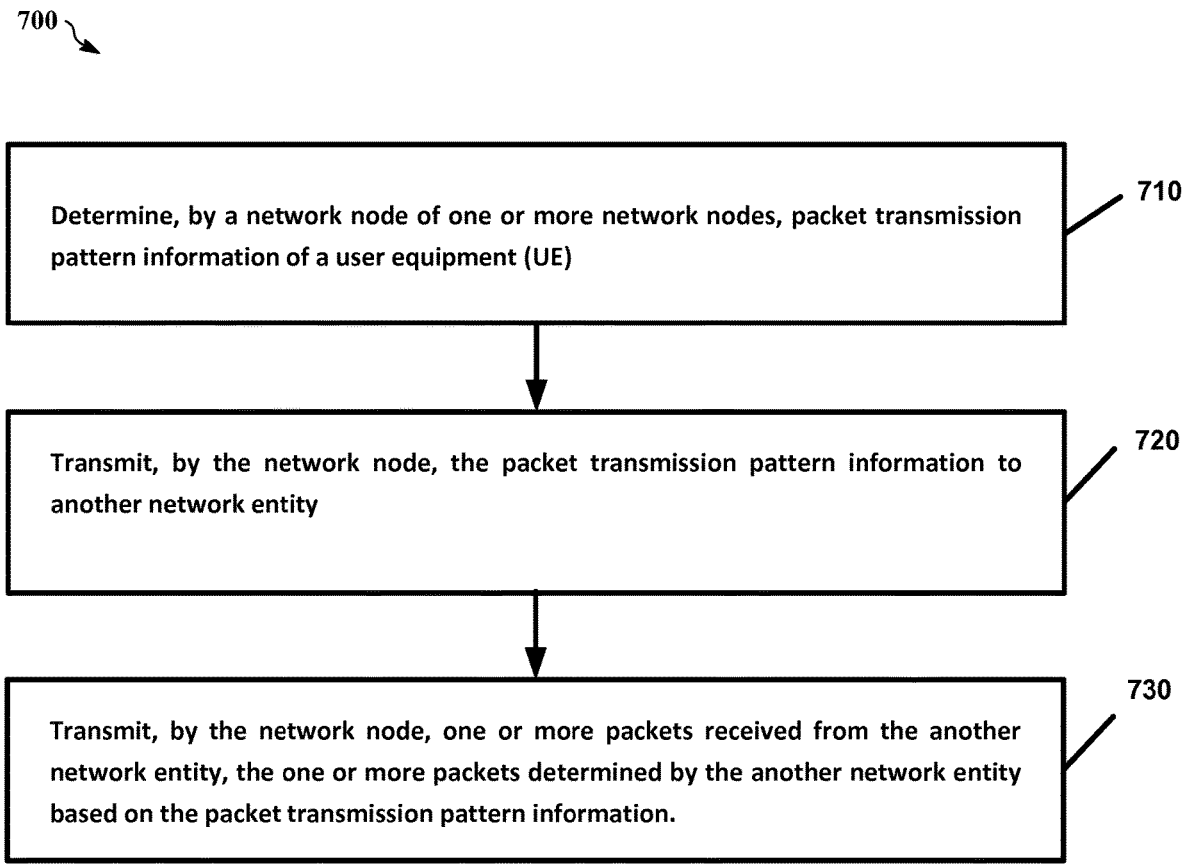
FIG. 7 is a flow chart illustrating transmission of data from a network node, according to an additional example implementation.

FIG. 7 is a flow chart 700 illustrating transmission of data from a network node, according to an additional example implementation.

At block 710, a network node (e.g., MgNB 210) may determine packet transmission pattern information (e.g., packet transmission pattern information 450) of a UE (e.g., UE 202).

At block 720, the network node (e.g., MgNB 210) may transmit the packet transmission pattern information (e.g., packet transmission pattern information 450) to another network entity (e.g., network entity 452).

At block 730, the network node (e.g., MgNB 210) may transmit one or more packets received from another network entity (e.g., network entity 452) based on the packet transmission pattern information 450.

Example 1. A method of communications, comprising: receiving, by a user equipment (UE), packet transmission pattern information from a first network node of one or more network nodes, the packet transmission pattern information indicates using different radio links by the user equipment (UE) for transmitting consecutive packets from the user equipment (UE) to the one or more network nodes, the radio links being associated with the one or more network nodes; and transmitting, by the user equipment (UE), the consecutive packets using the different radio links indicated in the packet transmission pattern information.

Example 2. According to an example aspect of the method of Example 1, further comprising: determining, by the user equipment (UE), whether the packet transmission pattern information indicates duplication of packets; duplicating the packets, by the user equipment (UE) in response to the determining; and transmitting, by the user equipment, the duplicated packets using different radio links.

Example 3. According to an example aspect of the method of Example 1 or 2, wherein the consecutive and/or the duplicated packets are transmitted by the user equipment (UE) using a primary radio link and a secondary radio link, and wherein the primary and second radio links are dynamically changed by the user equipment (UE).

Example 4. According to an example aspect of the method of Example 1, wherein the first network node is a master gNB (MgNB) or a gNB centralized unit (gNB-CU).

Example 5. According to an example aspect of the method of Example 1, wherein each of the one or more network nodes is configured with one or more component carriers (CCs).

Example 6. According to an example aspect of the method of Example 1, wherein the one or more network nodes include a master gNB (MgNB) and a secondary (SgNB).

Example 7. According to an example aspect of the method of Example 1 or 2, wherein the packet transmission pattern information includes a cyclic pattern.

Example 8. According to an example aspect of the method of Example 1, wherein the packet transmission pattern information includes a cyclic pattern that uses indices, bitmaps, paired vectors, or any combination thereof.

Example 9. According to an example aspect of the method of Example 1 or 8, wherein the packet transmission pattern information includes a validity timer indicating a duration during which the packet transmission pattern information is valid at the user equipment (UE).

Example 10. According to an example aspect of the method of Example 1 or 8, wherein the packet transmission pattern information indicates a number of packets to be transmitted by the user equipment (UE) based on the packet transmission pattern information.

Example 11. According to an example aspect of the method of Example 1 or 8-10, wherein the packet transmission pattern information is a first packet transmission pattern information, and further comprising: receiving, from a network node of the one or more network nodes, a second packet transmission pattern information, the second packet transmission pattern information being used by the user equipment (UE) upon expiration of the validity timer associated with the first packet transmission pattern information.

Example 12. According to an example aspect of the method of Example 1 or 8-11, wherein the packet transmission pattern information is first packet transmission pattern information, and further comprising: receiving, from a network node of the one or more network nodes, a second packet transmission pattern information, the second packet transmission pattern information used by the user equipment (UE) for transmitting one or more packets after the receiving of the second packet transmission pattern information Example 13. According to an example aspect of the method of Example 1 or 8-12, further comprising: receiving an indication, from the first network node, terminating use of the packet transmission pattern information, the first packet transmission pattern information, or the second packet transmission pattern information; and transmitting, by the user equipment (UE), the consecutive packets based on previously configured transmission pattern at the user equipment (UE). In an example aspect, the previous configured transmission pattern is a default transmission pattern which indicated the use of the primary radio link only unless duplication is requested.

Example 14. An apparatus comprising at least one processor and at least one memory including computer instructions, when executed by the at least one processor, cause the apparatus to perform a method of any of Examples 1-13.

Example 15. An apparatus comprising means for performing a method of any of Examples 1-13.

Example 16. A non-transitory computer-readable storage medium having stored thereon computer executable program code which, when executed on a computer system, causes the computer system to perform the steps of any of Examples 1-13.

Example 17. A method of communications, comprising: determining, by a network node of a set of network nodes, packet transmission pattern information for a user equipment (UE), the packet transmission pattern information indicates use of different radio links by the user equipment (UE) for transmitting consecutive packets from the user equipment (UE), the set of network nodes configured for delivery of data to the user equipment (UE); and transmitting, by the network node, the packet transmission pattern information to the user equipment (UE).

Example 18. According to an example aspect of the method of Example 17, wherein the network node is a first network node, and the transmitting further includes: transmitting, by the first network node, relevant portions of the packet transmission pattern information to a second network node of the set of network nodes.

Example 19. According to an example aspect of the method of Example 18, wherein the first network node and/or the second network nodes provide one or more scheduling grant/grants to the user equipment (UE) based on the packet transmission pattern information.

Example 20. According to an example aspect of the method of Example 19, wherein one or more scheduling grant/grants include one or more pre-allocated or pre-configured grant/grants.

Example 21. According to an example aspect of the method of Example 17, further comprising: receiving, by the network node, some of the consecutive packets from the user equipment (UE).

Example 22. According to an example aspect of the method of Example 17, wherein the packet transmission pattern information is determined based on reliability target metrics, survival time, knowledge and quality of the different radio links, location of the user equipment (UE), mobility of the user equipment (UE), trajectory of the user equipment (UE), or a combination thereof.

Example 23. According to an example aspect of the method of Example 17, wherein the network node is a master gNB (MgNB).

Example 24. According to an example aspect of the method of Example 17, wherein each of the set of network nodes is configured with one or more component carriers (CCs).

Example 25. According to an example aspect of the method of Example 17 or 24, wherein the set of network nodes include a master gNB (MgNB) and a secondary (SgNB).

Example 26. According to an example aspect of the method of Example 17, wherein packet transmission pattern information includes a cyclic pattern.

Example 27. According to an example aspect of the method of Example 17, wherein the packet transmission pattern information includes a cyclic pattern that uses indices, bitmaps, paired vectors, or any combination thereof.

Example 28. According to an example aspect of the method of Example 17 or 27, wherein the packet transmission pattern information includes a validity timer indicating a duration during which the packet transmission pattern information is valid at the user equipment (UE).

Example 29. According to an example aspect of the method of Example 17 or 27-28, wherein the packet transmission pattern information is first packet transmission pattern information, and further comprising: transmitting, from the first network node, second packet transmission pattern information, the second packet transmission pattern information being used by the user equipment (UE) upon expiration of the validity timer associated with the first packet transmission pattern information.

Example 30. According to an example aspect of the method of Example 29, and further comprising: receiving, from the user equipment (UE), some of the one or more consecutive packets from the user equipment (UE) over the one or more radio links between the network node and the user equipment (UE) using the second packet transmission pattern information.

Example 31. According to an example aspect of the method of Example 17 and 27-30, further comprising: transmitting an indication, from the first network node, terminating use of the packet transmission pattern information, the first packet transmission pattern information, or the second packet transmission pattern information.

Example 32. An apparatus comprising at least one processor and at least one memory including computer instructions, when executed by the at least one processor, cause the apparatus to perform a method of any of Examples 17-31.

Example 33. An apparatus comprising means for performing a method of any of Examples 17-31.

Example 34. A non-transitory computer-readable storage medium having stored thereon computer executable program code which, when executed on a computer system, causes the computer system to perform the steps of any of Examples 17-31.

Example 35. A method of communications, comprising: determining, by a network node of one or more network nodes, packet transmission pattern information of a user equipment (UE); transmitting, by the network node, the packet transmission pattern information to another network entity; and transmitting, by the network node, one or more packets received from the another network entity, the one or more packets determined by the another network entity based on the packet transmission pattern information.

Example 36. According to an example aspect of the method of Example 35, wherein the another network entity is a core network entity or non-3GPP entity.

Example 37. According to an example aspect of the method of Example 35, wherein the network node is a master gNB (MgNB).

Example 38. According to an example aspect of the method of Example 35, wherein the network node is a master gNB (MgNB) configured with a plurality of component carriers (CCs).

Example 39. According to an example aspect of the method of Example 35, wherein each of the one or more network nodes is configured with one or more component carriers (CCs).

Example 40. According to an example aspect of the method of Example 35 or 36, wherein the core network entity duplicates the one or more packets based on the packet transmission pattern information.

Example 41. An apparatus comprising at least one processor and at least one memory including computer instructions, when executed by the at least one processor, cause the apparatus to perform a method of any of Examples 35-40.

Example 42. An apparatus comprising means for performing a method of any of Examples 35-40.

Example 43. A non-transitory computer-readable storage medium having stored thereon computer executable program code which, when executed on a computer system, causes the computer system to perform the steps of any of Examples 35-40.

Figure 8:
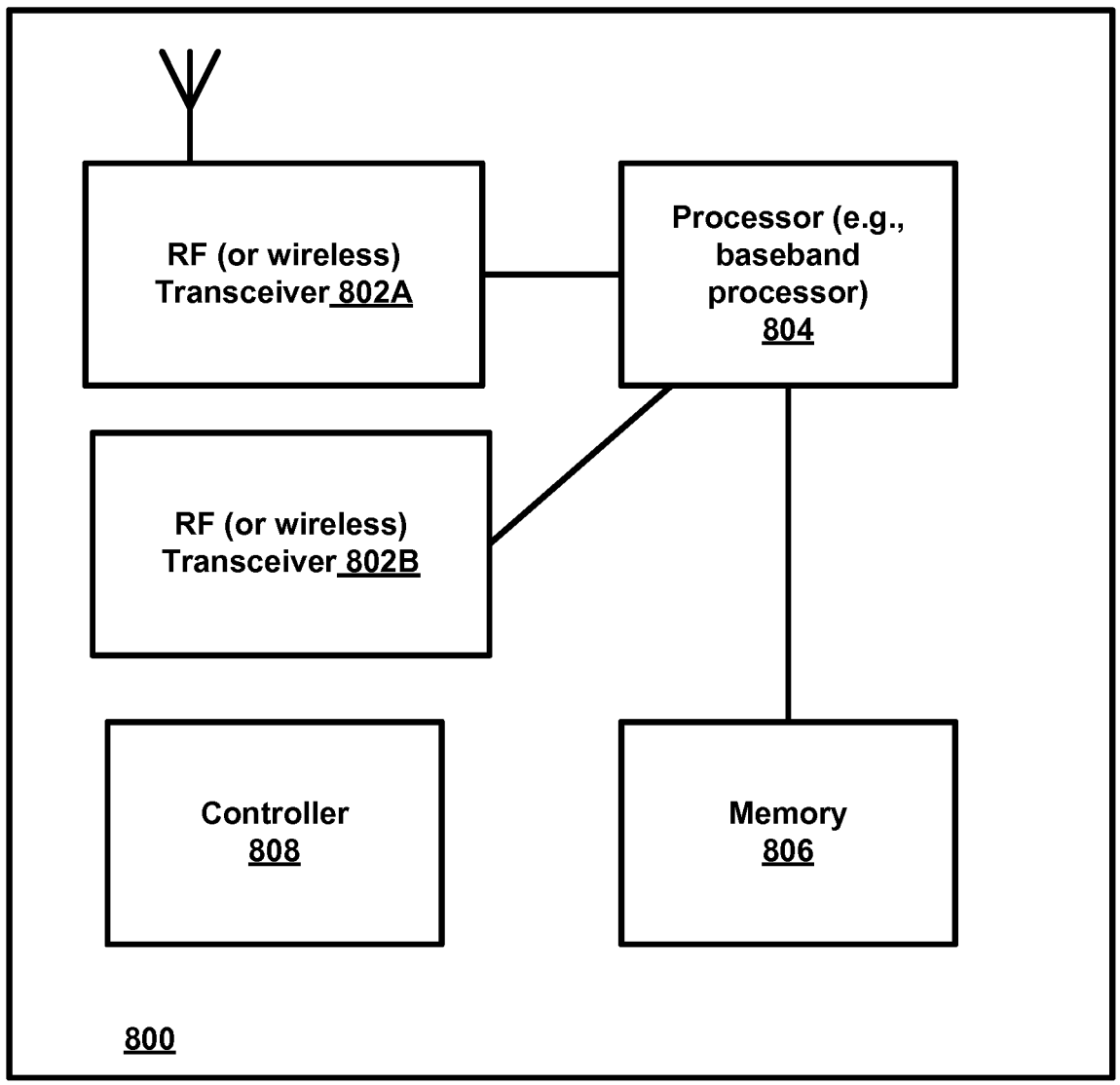
FIG. 8 is a block diagram of a node or wireless station (e.g., base station/access point or mobile station/user device/UE), according to an example implementation.

FIG. 8 is a block diagram of a wireless station (e.g., user equipment (UE)/user device or AP/gNB/MgNB/SgNB) 800 according to an example implementation. The wireless station 800 may include, for example, one or more RF (radio frequency) or wireless transceivers 802A, 802B, where each wireless transceiver includes a transmitter to transmit signals and a receiver to receive signals. The wireless station also includes a processor or control unit/entity (controller) 804/808 to execute instructions or software and control transmission and receptions of signals, and a memory 806 to store data and/or instructions.

Processor 804 may also make decisions or determinations, generate frames, packets or messages for transmission, decode received frames or messages for further processing, and other tasks or functions described herein. Processor 804, which may be a baseband processor, for example, may generate messages, packets, frames or other signals for transmission via wireless transceiver 802 (802A or 802B). Processor 804 may control transmission of signals or messages over a wireless network, and may control the reception of signals or messages, etc., via a wireless network (e.g., after being down-converted by wireless transceiver 802, for example). Processor 804 may be programmable and capable of executing software or other instructions stored in memory or on other computer media to perform the various tasks and functions described above, such as one or more of the tasks or methods described above. Processor 804 may be (or may include), for example, hardware, programmable logic, a programmable processor that executes software or firmware, and/or any combination of these. Using other terminology, processor 804 and transceiver 802 together may be considered as a wireless transmitter/receiver system, for example.

In addition, referring to FIG. 8, a controller (or processor) 808 may execute software and instructions, and may provide overall control for the station 800, and may provide control for other systems not shown in FIG. 8, such as controlling input/output devices (e.g., display, keypad), and/or may execute software for one or more applications that may be provided on wireless station 800, such as, for example, an email program, audio/video applications, a word processor, a Voice over IP application, or other application or software. Moreover, a storage medium may be provided that includes stored instructions, which when executed by a controller or processor may result in the processor 804, or other controller or processor, performing one or more of the functions or tasks described above.

According to another example implementation, RF or wireless transceiver(s) 802A/802B may receive signals or data and/or transmit or send signals or data. Processor 804 (and possibly transceivers 802A/802B) may control the RF or wireless transceiver 802A or 802B to receive, send, broadcast or transmit signals or data.

The aspects are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer, chip or chipset. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

What is claimed is:

1. An apparatus comprising:
at least one processor; and
at least one memory including computer program code;
the at least one memory and the computer program code configured to, with the at least one processor, cause the apparatus to:
receive, by a user equipment (UE), packet transmission pattern information from a first network node of one or more network nodes, the packet transmission pattern information indicates an assignment of one or more radio links to be used by the user equipment (UE) for transmission of each packet of a set of consecutive packets, the radio links being associated with the one or more network nodes; and
transmit, by the user equipment (UE), the set of consecutive packets using the radio links according to the packet transmission pattern information.

2. The apparatus of claim 1, wherein the processor and the computer program code are configured to further cause the apparatus to:
determine, by the user equipment (UE), whether the packet transmission pattern information indicates duplication of packets;
duplicate the packets, by the user equipment (UE) in response to the determining; and
transmit, by the user equipment, the duplicated packets using the radio links.

3. The apparatus of claim 1, wherein the set of consecutive packets are transmitted by the user equipment (UE) using a primary radio link and a secondary radio link, and wherein the primary and secondary radio links are dynamically changed by the user equipment (UE).

4. The apparatus of claim 1, wherein the first network node is a master gNB (MgNB) or a gNB centralized unit (gNB-CU).

5. The apparatus of claim 1, wherein each of the one or more network nodes is configured with one or more component carriers (CCs).

6. The apparatus of claim 1, wherein the one or more network nodes include a master gNB (MgNB) and a secondary (SgNB).

7. The apparatus of claim 1, wherein the packet transmission pattern information includes a cyclic pattern.

8. The apparatus of claim 1, wherein the packet transmission pattern information includes a cyclic pattern that uses indices, bitmaps, paired vectors, or any combination thereof.

9. The apparatus of claim 1, wherein the packet transmission pattern information includes a validity timer indicating a duration during which the packet transmission pattern information is valid at the user equipment (UE).

10. The apparatus of claim 1, wherein the packet transmission pattern information indicates a number of packets to be transmitted by the user equipment (UE) based on the packet transmission pattern information.

11. The apparatus of claim 1, wherein the packet transmission pattern information is a first packet transmission pattern information, and wherein the processor and the computer program code are configured to further cause the apparatus to:
receive, from a network node of the one or more network nodes, a second packet transmission pattern information, the second packet transmission pattern information being used by the user equipment (UE) upon expiration of the validity timer associated with the first packet transmission pattern information.

12. The apparatus of claim 1, wherein the packet transmission pattern information is a first packet transmission pattern information, wherein the processor and the computer program code are configured to further cause the apparatus to:
receive, from a network node of the one or more network nodes, a second packet transmission pattern information, the second packet transmission pattern information used by the user equipment (UE) for transmitting one or more packets after the receiving of the second packet transmission pattern information.

13. The apparatus of claim 1, wherein the processor and the computer program code are configured to further cause the apparatus to:
receive an indication, from the first network node, terminating use of the packet transmission pattern information; and
transmit, by the user equipment (UE), the set of consecutive packets based on a previously configured packet transmission pattern information at the user equipment (UE).

14. An apparatus comprising:
at least one processor; and
at least one memory including computer program code;
the at least one memory and the computer program code configured to, with the at least one processor, cause the apparatus to:
determine, by a network node of a set of network nodes, packet transmission pattern information for a user equipment (UE), the packet transmission pattern information indicates an assignment of one or more radio links to be used by the user equipment (UE) for transmission of each packet of a set of consecutive packets, the set of network nodes configured for delivery of data to the user equipment (UE); and
transmit, by the network node, the packet transmission pattern information to the user equipment (UE).

15. The apparatus of claim 14, wherein the packet transmission pattern information includes a cyclic pattern that uses indices, bitmaps, paired vectors, or any combination thereof.

16. The apparatus of claim 14, wherein the packet transmission pattern information includes a validity timer indicating a duration during which the packet transmission pattern information is valid at the user equipment (UE).

17. The apparatus of claim 14, wherein the packet transmission pattern information is a first packet transmission pattern information, wherein the processor and the computer program code are configured to further cause the apparatus to:
transmit, from the first network node, a second packet transmission pattern information, the second packet transmission pattern information being used by the user equipment (UE) upon expiration of the validity timer associated with the first packet transmission pattern information.

18. The apparatus of claim 17, wherein the processor and the computer program code are configured to further cause the apparatus to:
receive, from the user equipment (UE), some of the consecutive packets from the user equipment (UE) over at least some of the one or more radio links between the network node and the user equipment (UE) using the second packet transmission pattern information.

19. The apparatus of claim 14, wherein the processor and the computer program code are configured to further cause the apparatus to:
- transmit an indication, from the first network node, terminating use of the packet transmission pattern information.

20. An apparatus comprising:
- at least one processor; and
- at least one memory including computer program code;
- the at least one memory and the computer program code configured to, with the at least one processor, cause the apparatus to:
- determine, by a network node of one or more network nodes, a packet transmission pattern information of a user equipment (UE) that indicates an assignment of one or more radio links to be used by the user equipment (UE) for transmission of each packet of a set of consecutive packets;
- transmit, by the network node, the packet transmission pattern information to another network node; and
- transmit, by the network node, one or more packets received from the another network node, the one or more packets determined by the another network entity based on the packet transmission pattern information.

21. The apparatus of claim 1, wherein the packet transmission pattern information comprises at least one of the following:
- a cyclic pattern of radio link identifiers, wherein each link identifier is associated with a packet of the set of packets to be transmitted; and/or
- a bitmap indicating a set of radio links to be used for transmission of an associated set of packets.

* * * * *